United States Patent

Bramson et al.

[15] 3,645,014
[45] Feb. 29, 1972

[54] SIMULATOR COMPUTER

[72] Inventors: Arnold Bramson, Silver Spring; Wilbur H. Day, Annapolis, both of Md.

[73] Assignee: Singer-General Precision, Inc., Binghamton, N.Y.

[22] Filed: Dec. 29, 1969

[21] Appl. No.: 888,423

Related U.S. Application Data

[63] Continuation-in-part of Ser. No. 803,703, Mar. 3, 1969, abandoned.

[52] U.S. Cl. ...........................................................35/12 K
[51] Int. Cl. ......................................B64g 7/00, G09b 9/08
[58] Field of Search ...................................35/12 K; 235/154

[56] References Cited

UNITED STATES PATENTS 3,036,772   5/1962   Pughe, Jr. ..............................235/154
3,400,471   9/1968   Papin et al. ............................35/12 K

*Primary Examiner*—Robert W. Michell
*Assistant Examiner*—L. R. Oremland
*Attorney*—Francis L. Masselle, William Grobman and Andrew G. Pullos

[57] ABSTRACT

This system provides means for computing the forces and moments on and developed by the rotary wing of rotary-wing aircraft for realtime simulation purposes. The system includes a plurality of control signal generators for generating information relating to various components of rotary-wing aircraft and means to compute from these resultant signals quantities representative of the final resultant forces on the aircraft, its rotary wing, and other components. In particular, this specification describes equipment for computing the forces and moments developed by and on the rotary wing by utilizing aircraft design data and data produced in actual flight tests.

7 Claims, 4 Drawing Figures

SIMULATOR COMPUTER

This application is a continuation-in-part of copending application serial number 803,703, now abandoned entitled Simulator Computer, filed on Mar. 3, 1969, in the name of Arnold Bramson and Wilbur H Day.

This invention relates to simulators and more particularly to means for developing signals representative of the forces developed by and on the systems of modern high-speed devices having complex modes of operation.

Modern high-speed and complex machinery normally have a wide variety of operating modes which change rapidly in complicated patterns. Such equipment is usually used to the limits of their operating ranges, and in such operation the responses, the power produced or utilized, the effective dimensional changes, and other such characteristics usually vary nonlinearly. The simulation of such equipment is difficult if the simulation is to be realistic. One problem is the large amount of computation required in a digital simulator to cover the entire operating range of such a complex system in a realistic manner with high resolution in a realtime mode. Of course, this can be overcome by using a large capacity, high-speed digital computer or several smaller computers, but such a solution is a crude approach which may substitute the problem of high maintenance and cost for that of superfluous computational power. The description of this invention, which overcomes the problems mentioned above, will be limited to a description of one system with complex operating characteristics and the means for simulating such a system. To do otherwise would be to expand this specification beyond reasonable bounds. However, it must be borne in mind that although only one system is used to explain the invention, it is, in fact, applicable to any system with similar complex operating characteristics. Consider for this description the problems of simulating modern, high-speed rotary-wing aircraft. Simulators for rotary-wing aircraft are not new. However, in the past the rotary-wing aircraft being simulated had limited capabilities. These aircraft were comparatively low speed, had relatively poor performance, and had engines which had low-power outputs by present-day standards. As a result, the reaction time of the aircraft themselves was not critical and, in the machines simulating them, the computation of digital values representative of the resultant forces and moments on the rotary-wing and other aircraft components were readily accomplished in "realtime." However, with the capabilities of modern rotary-wing aircraft increasing at a tremendous rate and with the development and utilization of high-speed compound aircraft, the problems of producing realistic responses in a rotary-wing simulator has become more and more difficult. This is particularly clear when the methods of computing the forces developed by and on the rotary wing are analyzed. In one typical method, each blade of the rotary wing is depicted as comprising 29 separate, small elements. Each blade is then represented in each of 72 positions in its rotary path. This analysis provides 2,088 different points at which the forces and moments at any instant are being generated. Each force at each point results in a separate computation. The resulting number of computations which must be performed in order to produce realtime simulation is tremendous. As the transient response of modern rotary-wing aircraft increases and as the magnitude of forces involved increases, the time available for computation rapidly decreases, and the past methods of simulation necessarily become more approximate and, thus, less accurate.

It is, therefore, an object of this invention to provide a new and improved system for performing the computations for the simulation of complex systems.

It is another object of this invention to provide a new and improved system for simulating rotary-wing aerodynamics.

It is another object of this invention to provide a new and improved system for rapidly and accurately simulating rotary-wing aircraft.

It is a further object of this invention to provide new and improved systems for accurately and rapidly computing by digital means the responses of and the forces on and generated by complex and high-speed systems.

Other objects and advantages of this invention will become more apparent as the following description proceeds, which description should be considered together with the accompanying drawings in which.

Figure 1:
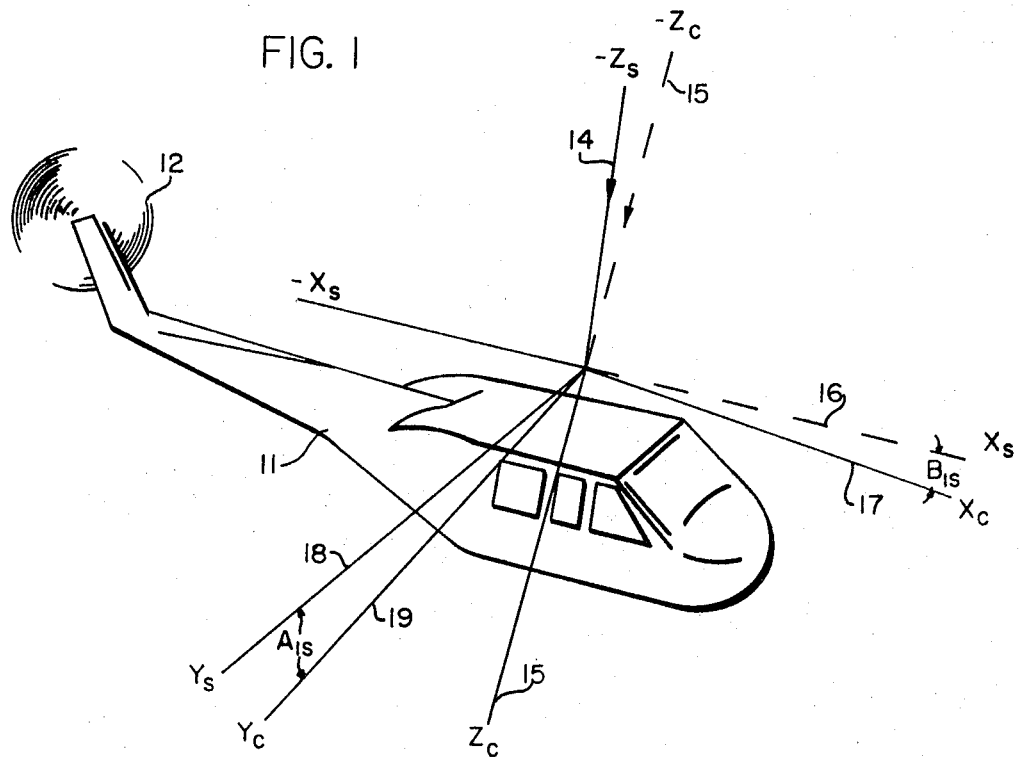
FIG. 1 is a pictorial representation of a rotary-wing aircraft showing some of the force axes.

Referring now to the drawings in detail and more particularly to FIG. 1, the reference character 11 designates the fuselage of a rotary-wing aircraft more commonly designated a helicopter. An antitorque rotor 12 is mounted at the tail of the fuselage 11, and a vertical shaft located at approximately the center of gravity of the fuselage 11 is adapted to carry a rotary wing or main rotor. Although, to avoid confusion, the rotary wing itself is not shown in FIG. 1, the several axes of the rotor are shown. The vertical axis 14 is designated $Z_s$ and represents the downward force on the shaft. A second axis 15 designated $Z_c$ is slightly displaced from the shaft axis 14 and represents downward force on the rotary wing. One of the horizontal axes 16 is the longitudinal axis perpendicular to the shaft, and displaced from it at an angle $B_{1s}$ is a second longitudinal axis $X_c$ (17) which represents a deviation from the normal longitudinal shaft axis 16 produced by the pilot moving the aircraft controls. The third mutually perpendicular axis, $Y_s$, is the lateral axis 18 normally perpendicular to the plane formed by axes 14 and 16. Displaced at a small angle from the axis 18 is a second lateral axis 19, $Y_c$, which angle represents the displacement produced by the pilot at the controls.

Generally speaking, the axes shown in FIG. 1 can be divided into two groups. Those axes with the subscript s, $Z_s$, $X_s$, and $Y_s$ (14, 16, and 18), are the axes which represent the direction of the forces on the rotor shaft. The second group of axes with the subscript c, $Z_c$, $X_c$, and $Y_c$ (15, 17, and 19), represent the forces applied to the rotary wing, or, in another way, to that plane which can be substituted for the instantaneous path of the rotary wing. This is known as the rotary tip-path-plane.

Figure 2:
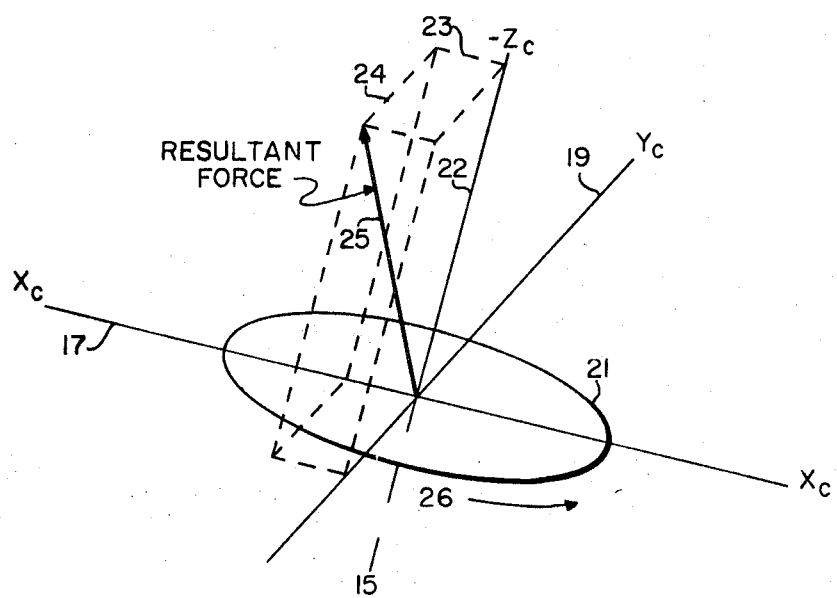
FIG. 2 is a chart representing the rotor tip-path-plane of the rotary-wing with some of the force vectors involved.

The rotary tip-path-plane is better shown in FIG. 2 in which the three control axes are shown at 15, 17, and 19, and the rotary tip-path-plane is designated 21. Projected upwardly from the rotor plane 21 is a dashed cube which comprises the force components in the three directions and the resultant force vector produced on the rotor plane 21 at any instant. Line 22 in the force component cube is representative of the force applied to the rotor plane 21. The line 22 is superimposed on the axis 15 and merely designates the magnitude of the vertical component of force. The dashed line 23 is parallel to the X axis 17 and represents the magnitude of the component of force on the rotor plane 21 in the X direction. In a similar manner, the dashed line 24 is parallel to the Y axis 19 and represents the magnitude of force on the rotor plane in the Y direction. The resultant force is represented by the heavy arrow 25 whose length is indicative of the magnitude of that force and whose direction from the center of the rotor plane 21 represents the resultant force vector on that plane. The assumed direction of rotation of the rotor is shown by the arrow 26. Further reference will be made to FIG. 2 as the explanation of the system proceeds.

Figure 3:
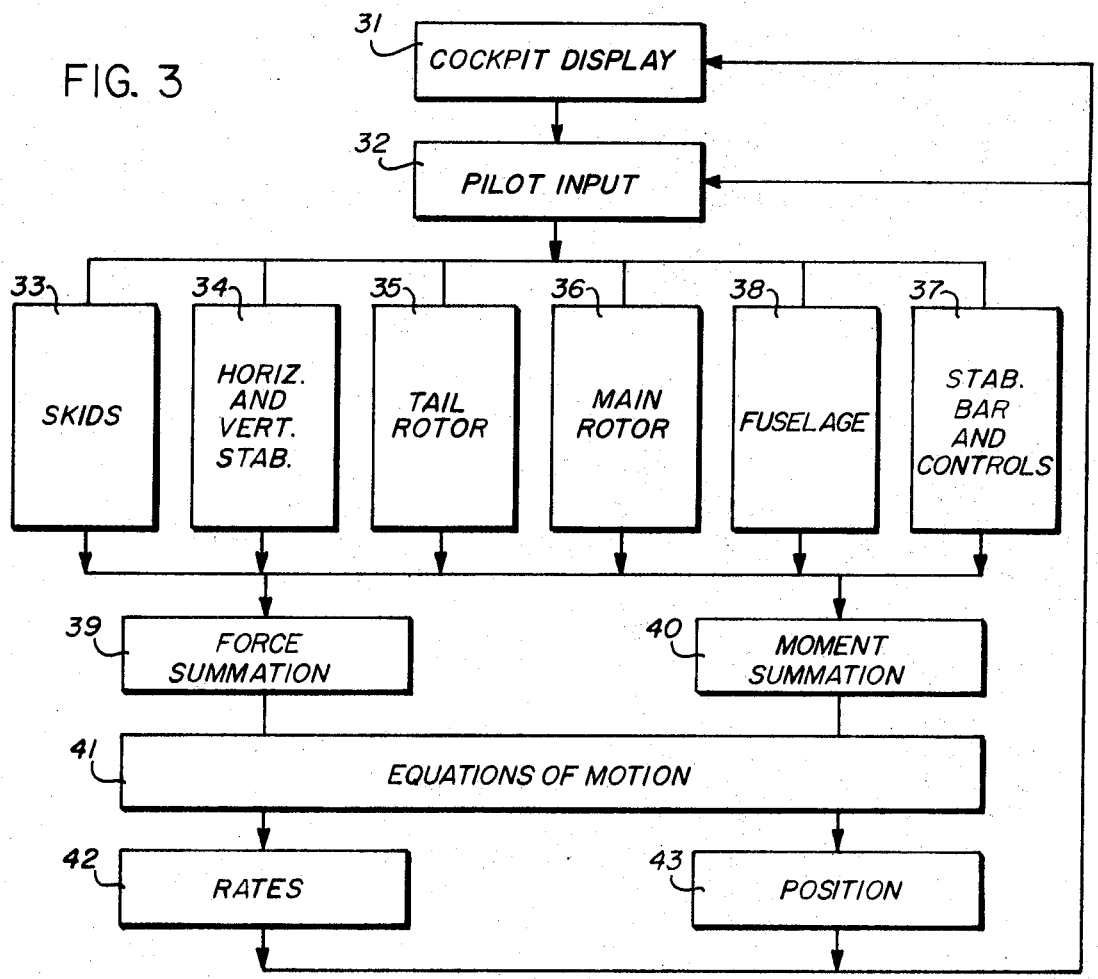
FIG. 3 is a block diagram of components used to generate the electrical signals in the simulation of rotary-wing aircraft.

The block diagram of FIG. 3 is a general block diagram of an aircraft simulator signal generator system. Two cockpit components are shown. These are the cockpit displays 31 and the pilot input 32. The pilot input 32 feeds a plurality of aircraft component signal generating systems. That signal generator which generates the signals representative of the actions upon the skids is produced by the system designated 33, and the horizontal and vertical stabilizer signals are produced by the system designated 34. The signals representative of the operation of the stabilizer bar and its controls are generated by the system designated 37, and the signals representative of the forces on the fuselage are generated in a system designated 38. The two rotors, the tail antitorque rotor, and the main rotor, have signals generated by the two systems designated 35 and 36. The outputs of these signal generation systems are applied simultaneously to two separate components, a force summation component 39 and a moment summation component 40. The input bus to the computing elements can be represented by the block 41 entitled equations of motion, and the forces and moments applied to that input bus are fed to the two general computing systems designated in FIG. 3 as the rate system 42 and the position system 43.

FIG. 3 is a generalized representation of a system for generating and computing those signals which control the simulation of the vehicle. The pilot is represented by the block 32 and the inputs from the pilot are generated by the positioning of his controls. The simulated pilot-controls in a simulator cockpit drive potentiometers, occasionally synchro drives, and similar transducer devices. The outputs from these devices will be signals which are representative of the magnitude and sense of the inputs applied by the pilot. Thus, for example, if the controls drive potentiometers, and the potentiometers are energized, a zero center potentiometer wound with a sine configuration can produce output signals representative of the sine or cosine of an angle of deflection. The information generated by the pilot controls is applied, usually along separate electrical lines, to the various inputs shown by the blocks 33, 34, 35, 36, 37, and 38. In addition to the inputs from the pilot, each of these devices represented by the block 33–38 generates electrical signals representative of external forces, which representations may be applied to a computer, other sensing devices, instructor stations, or the like. The individual outputs representative of the information from each of the vehicle components are applied in parallel to two electrical summing devices 39 and 40. The device 39 produces signals representative of the force summation and the device 40 produces signals representative of the moment summation. These summation signals are applied to the input bus 41 which feeds the appropriate signals to the two computer systems 42 and 43. The outputs from the rate computer system 43 are fed back in a closed circuit type of system to control the displays 31 in the cockpit and to affect the pilot input component 32. In general, most of the elements shown in FIG. 3 and the overall combination have been used in the past in other systems of a similar nature. However, the rotary-wing aircraft requires two signal generators which are not usually found in other vehicles. These are the tail rotor generator 35 and the main rotor generator 36. The operation of the tail rotor generator 35 is fairly simple since the operation of the tail rotor itself is rather straight forward. The tail rotor on a rotary-wing aircraft is used merely to counter the rotational moment produced by the rotating wing and to provide directional control to the fuselage 11. This requires a very small number of variable parameters, and the device itself is similar to a simulated variable pitch propeller, which is conventional. Therefore, further descriptive details will be limited to the simulation of the main rotor or rotor wing. The rotary wing of a rotary-wing aircraft is a fairly simple mechanical structure, but its operation is complex. The rotary wing considered herein is comprised of two separate blades individually pivotally mounted on a rotating hub. Each blade has an airfoil shape with a leading edge and a trailing edge. The rotary wing provides the aircraft with both lift and translational motion. As the blades rotate one is advancing in the direction of flight and the other is retreating. The speed of each blade with respect to the air is the actual speed of the advancing blade plus the forward speed of the aircraft and the difference between the actual speed of the retreating blade and the forward speed of the aircraft. In addition, as a blade advances, it presents one angle of attack, and as it retreats it presents another to stabilize the aircraft. Otherwise one blade would be applying an upward force on one side of the rotating hub and the other blade would apply a downward force on the other side of the hub to create moments tending to rotate the aircraft about its longitudinal axis. The continually changing direction of the blades as they rotate create flapping of the rotating wing. From the above, it should be clear that there is no readily conceived simple mathematical expression which accurately represents the overall operation of a rotary wing and its effect upon the fuselage of the aircraft.

There are several earlier methods for mathematically representing the operation of a rotary wing and its effects upon the fuselage. Most suffer from the same disadvantages. Because of the large numbers of computations which must be made under these older methods, a considerable length of time is required to perform those computations. If, however, the results are required in a less time, approximations must be made and the results are not updated sufficiently often. The result is a mathematical representation which approximates the operation of the rotary wing, and not very closely. In the simulation of such a device, reality is very important. As mentioned above, one method of mathematically representing the effect of a rotary wing on the aircraft which supports it is by establishing mathematical expressions for each of a plurality of blade elements, integrating those expressions to determine the effect on each blade, establishing mathematical expressions for each of many blade positions in the blade-tip-plane, and integrating these expressions to obtain the overall effect of the rotary wing upon the rest of the aircraft. Each blade element at each blade position requires separate computations, and the mathematical expressions are not very precise at the operating limits. This invention contemplates reducing the number of independent variables in such mathematical expressions to the smallest number which, in combination, uniquely determines all possible operating conditions of a rotating wing, deriving mathematical relationships among the reduced number of variables to define the operation of the rotating wing, using performance and design data and the mathematical relationships derived, computing the values of the variables for a wide range of operating conditions, and storing for later use in computing simulated rotor forces and moments.

The resultant force on the main rotor is a function of many variables. This force can be represented, for example, by:

$$F_{MR} = f(N_{MR}, A_{OS}, A_1, B_1, U, V, W, q_1, p, r, \rho, Q_{MR}, X_{MR}, Y_{MR}, Z_{MR})$$

where:
$F_{MR}$ is the resultant force on the main rotor
$N_{MR}$ is the r.p.m. of the main rotor
$A_{OS}$ is collective pitch at the swash plate
$A_1$ is the lateral cyclic deflection due to pilot input
$B_1$ is the longitudinal cyclic deflection due to pilot input
U is the longitudinal velocity—along the X body axis
V is the lateral velocity—along the Y body axis
W is the vertical velocity—along the Z body axis
$p$ is the rolling rate about the X body axis
$q_1$ is the pitching rate about the Y body axis
$r$ is yawing rate about the Z body axis
$\rho$ is the ambient air density
$Q_{MR}$ is the torque of main rotor
$X_{MR}$ is the force of the main rotor along X body axis
$Y_{MR}$ is the force of the main rotor along Y body axis
$Z_{MR}$ is the force of the main rotor along the Z body axis.

Computing the main rotor force $F_{MR}$ for each change in each of the variables requires a large amount of time and equipment. One manner in which this time and equipment can be kept small, as explained above, is to reduce the resolution. However, this method is not satisfactory. It has been found that the number of variables to produce all values of $F_{MR}$ can be reduced to three. These three are $\lambda$, $\mu$, and $\theta$ where:
$\theta = A_{OS} - K_1$
$\mu = \mu' \cos \pi_c \cos \rho_c$
$\mu' = V_T / K_2 \Omega_{MR}$ $$\lambda = \mu \left[ (\cos \beta \tan \alpha_c - \sin \beta \tan \phi_c) \right] - \frac{C_{TN-1}}{2(\mu^2 + \lambda^2 N - 1)} \frac{1}{2}$$

$\alpha_c$ – angle of attack $\phi_c$—bank angle
$V_T$—total velocity of tail rotor
$\Omega$—angular velocity of main rotor
$\cos\beta$—side slip ∠
$C_{TN-1}$ previous value of thrust coefficient.

From these equations, six coefficients can be derived. These coefficients are:

$C_T = [f(\lambda, \mu, \theta)]$
$C_H = f(C_T, \mu, \theta)$
$C_L = f(\lambda, \mu, \theta)$
$C_\nu = f(C_T, \mu, \theta)$
$C_p = f(C_l, \mu, \theta)$
$C_M = f(\lambda, \mu, \theta)$ where:
$C_T$ is the coefficient of thrust
$C_H$ is the coefficient of drag
$C_L$ is the rolling moment coefficient
$C_\nu$ is the side force
$C_p$ is the power coefficient
$C_M$ is the pitching moment coefficient.

Utilizing the above equations actual design and performance test data and analytically computed data of the particular aircraft to be simulated, the values of the coefficients $C_T$, $C_H$, $C_\nu$, $C_p$, $C_L$, and $C_M$ can be computed for a large number of different aircraft operating conditions and combinations of $\lambda$, $\mu$, and $\theta$. The computed values of these coefficients as functions of the values of $\lambda$, $\mu$, and $\theta$ which produced them are stored in a computer memory for recall. During a simulated flight, as the operating conditions being simulated change, the appropriate values of $C_T$, $C_H$, $C_p$, $C_L$, $C_\nu$, and $C_M$ are recalled from memory and are used to compute the values to be fed into the flight computer to produce the effect of the main rotor upon the simulated aircraft. Where necessary, linear interpolation is used between adjacent stored values. By this procedure fewer computations are required to produce the results of the main rotor upon the aircraft; the use of actual aircraft test data assures improved accuracy of simulation; and the linear interpolation used between stored conditions maintains good resolution.

Since aircraft flight performance data are not usually available in the form required by the equations set forth above, and may not, in fact, be available for all conditions or for all factors needed, the actual flight performance data may be used in good stead to adjust computed values. Consider, for example, that the blade element approach which was described above is used to analyze the operation of the main rotor. As mentioned, the main rotor is divided into a number of elemental areas, the forces produced on the elemental areas are computed, then they are integrated over the entire rotor blade, the rotor blade is then considered in several positions in the rotor tip plane, and the forces are integrated over the entire plane. Using the equations so developed and the design data available for a particular aircraft, the several variables can be computed. These computed values are then compared with actual flight performance data for the aircraft, and where the computed values differ from the actual values, the constants used in the computations are adjusted, and the values are recomputed. This operation is repeated until the computed values agree with the actual flight data. Once the constants which will produce results sufficiently close to flight data are determined, these can then be used to compute the values of the coefficients which are stored in memory. Of course, the procedure described in this point is performed outside of the simulator and prior to any simulator mission. The same computations which produced the stored coefficients can be used in simulation to work backwards and, by using the computed $\lambda$, $\mu$, and $\theta$, can identify the required coefficients in storage. These coefficients are then recalled and used to determine the values to be fed to the flight computer.

Figure 4:
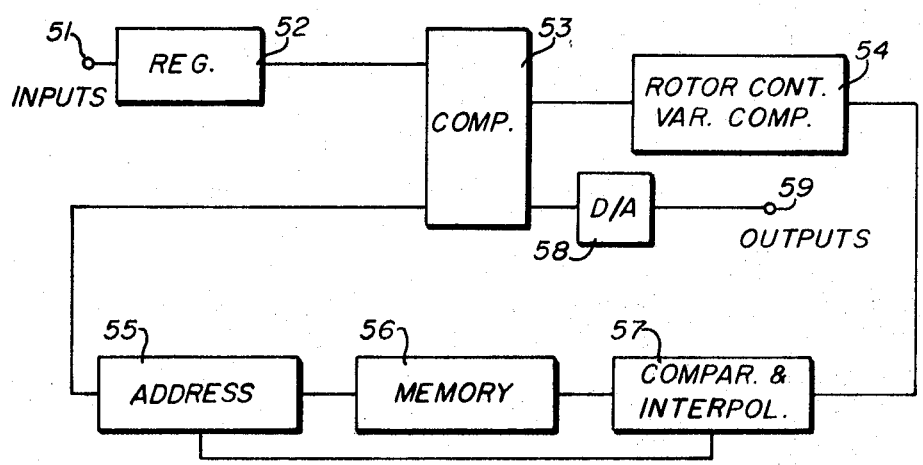
FIG. 4 is a block diagram of the computation system of this invention.

The block diagram of FIG. 4 is a generalized organization of a system which will perform the computations in accordance with these principles to accurately and rapidly simulate the performance of a helicopter main rotor. An input terminal 51 receives the inputs such as the pilot inputs to block 36 in FIG. 3. Actually, the inputs which are applied to the terminal 51 can readily comprise inputs from an instructor, inputs from changed operating conditions, inputs from adaptive training devices, etc., as well as inputs from the pilot's controls. A receiver 52 receives the input signals applied to computer 53. The computer 53 is loaded with a suitable computer program which is cyclically processed. As the computer program is being processed by the computer 53, the parameters in the program are updated in accordance with the information received by the receiver 52. The updated information is then applied to the input of a rotor control computational element 54. The computer 54 performs the necessary computations using the updated information from computer 53 to calculate the rotor control variables. These variables are then applied to an addressing system 55 where they are interpreted to identify addresses in a memory 56 which contains the coefficients $C_T$, $C_H$, $C_\nu$, $C_p$, $C_M$, and $C_L$, related to the computed variables. Under normal circumstances, the computed variables will identify not a single address, but several addresses which contain coefficients bracketing the particular variables computed. The information from the memory is first applied to a comparator and interpolator. The coefficients contained in the two identified memory addresses are interpolated to produce coefficients which correspond to the computed variables. The output of the interpolator 57 is applied to the input of the computer 53 which then performs force and moment computations using the coefficients derived from the memory 56 and the interpolator 57. The output of the computer 53 is then applied through a digital-to-analog converter 58 and thereby to an output terminal 59. The analog outputs at the terminal 59 are then applied through suitable equipment to the various components which make up the rotary-wing simulator to produce the desired responses in the simulator.

The above description of FIG. 4 is very broad and does not fully present the details of the operation to accomplish the objectives of this invention. In order to explain the operation more fully, reference must be made to earlier figures. Referring back to FIG. 2 wherein the main rotor plane 21 is depicted as a disc, changes in the spatial orientation of the rotor plane 21 produces changes in the forces operating at the main rotor. If it is initially assumed that the main rotor plane is horizontal, changes in the angle of attack, for example, will pivot the rotor plane 21 about the Y axis and change the rate of air flow into the plane. This will produce changes in the forces in the X and Z directions. In similar manner, pivoting the plane 21 about the X axis will cause changes in the forces on the main rotor in the Y and Z directions. The changes in the forces which are developed are not always linearly related to the amount or rate of angular change taking place, leading to a complex analytical computational situation. Therefore, it is usually not feasible to develop a simple computational procedure which can be used directly for realtime simulation of a complex system and which will produce realistic results. To reduce the complexity of computation, this invention reduces the number of variables used, computes the value of the variables from input data representing changes in the operation of the main rotor, and uses the values of the variables to determine points on the operating curves of the aircraft from which coefficients can be determined. The coefficients can be determined from actual flight performance data or can be calculated and adjusted to the actual test data as described above. Since the actual test data is the criterion of the accuracy of simulation, this invention assures accuracy of simulation. The reduction in the number of variables used to accomplish this reduces the complexity of computation required during simulation.

Once the coefficients are calculated and are stored in the computer memory, they can be recovered from memory whenever the values of the parameters are identified during subsequent simulation computations. Therefore, using the philosophy of this invention, the values of the coefficients $C_T$, $C_H$, $C_p$, $C_M$, $C_\nu$ and $C_L$ are computed with accuracies based upon available flight test data, and stored in the memory 56 of FIG. 4. To improve the accuracy of simulation without greatly increasing the complexity of computation, the spacing of the coefficients is selected to produce acceptable results. The utilization of the interpolator 57 then permits a greater resolution to be achieved by interpolating between adjacent coefficients where the computed variables demand it. Ultimately, since the parameters and the coefficients are based upon the resultant forces on the rotor plane 21, as a whole, rather than upon an analysis of elemental forces on the rotor, the number of computations required is much less than that required by prior art devices.

In the operation of the system of FIG. 4, the information applied at the input terminal 51 to the receiver 52, as mentioned above, updates the numerical values in the computer program in computer 53. Therefore, computer 54 now computes the values of new flight variables based upon this updated information. The new rotor parameters are computed by the computer 54 and applied through the address mechanism 55 to obtain from memory the appropriate previously computed coefficients which correspond to the unique flight variables under a particular set of rotor conditions. The coefficients recovered from memory are without dimension and are used to first compute the forces and moments on the rotor axes system itself. However, for utilization in a simulator, these forces and moments must be translated into components of the resultant forces and moments acting at the center of gravity of the aircraft. This relationship between the shaft forces and the control forces has been discussed above in connection with FIG. 1 from which it can be seen that the conversion of one set of axes to the other requires minimal effort. In fact, since the relationships are simple, the computer program in the computer 23 can be so written as to perform the conversion at the same time that the forces and moments are computed using values of the updated coefficients. This further reduces the amount of data required in the computations to produce the required electrical signals.

This invention has been described above in connection with the simulation of rotary-wing aircraft for which it is particularly well suited. However, this is but one example of the manner in which this invention may be used. At present, there is much research being undertaken in oceanology. It is still quite difficult to simulate the effects of the ocean on many things, for example submarines, sounds, etc. In the simulation of such complex systems as underwater acoustical systems which may be used for locating underwater mineral deposits or lost ships, or which may be used for navigation purposes, the multiple effects of the several thermal layers with their varying water densities and acoustical transmission characteristics, the effects of other acoustical interfaces which may cause diffraction or total reflection of the sound waves, the effects of currents with their differing densities, and similar phenomena produce a total simulation problem which requires extensive computation in a large computer complex. Even so, the simulation is only approximate. The use of this invention is excellent for such purposes. In this case, the oceanological research test data which are comparable to the performance data acquired for rotary-wing aircraft, the computations are made to determine suitable coefficients, and the coefficients are stored to be used during simulation. The apparatus shown in FIG. 4 is admirably suited for this purpose.

Of course for each utilization of this invention, slight modifications in the apparatus used may be required. It is realized that with work in other fields in which large amounts of complex computations are required, those versed in the art will find additional ways of using this invention without departing from its principles and spirit. It is, therefore, intended that this invention be limited only by the scope of the appended claims.

What is claimed is:

1. The method of simulating the operation of a machine having complex operating characteristics, said method comprising the steps of:

a. creating a first set of mathematical expressions which represents the operation of said machine as coefficients which are functions of independent variables;
   b. creating a second set of mathematical expressions in which address indicators are expressed as functions of said independent variables;
   c. storing in a simulator computer a plurality of previously computed values for said coefficients with the corresponding values of said address indicators serving as addresses therefor;
   d. generating in said simulator quantities representative of the total machine environmental condition at any given time;
   e. using said quantities in the simulator computer to compute by means of said second set of mathematical expressions values of said address indicators as functions of the quantities representing the total environmental condition of the machine at that time;
   f. retrieving from storage the values of said coefficients which correspond to the simulator computed values of said address indicators;
   g. using in said simulator computer the retrieved values of said coefficients to compute by means of said first set of expressions new values of said independent variables; and
   h. generating from said computer new values of said independent variable signals which cause said simulator to simulate the operation of said machine under the same total machine environmental condition and to create new values for said address indicators.

2. The method of simulating the operation of a machine having complex operating characteristics, said method comprising the steps of:

a. creating a first set of mathematical expressions which represents the operation of said machine as coefficients which are functions of independent variables;
   b. creating a second set of mathematical expressions in which address designators are expressed as functions of said independent variables;
   c. computing by said first and second sets of expressions values of said coefficients and corresponding address designators from selected values of said independent variables throughout the operating ranges of said machine;
   d. storing said computed values of said coefficients in a simulator computer with the corresponding values of said address designators serving as addresses therefore;
   e. generating by means of said simulator values which represent the condition of said machine and its environment at any given time;
   f. computing in said simulator computer by said second set of expressions values of address designators as functions of those values which represent the condition of the machine and its environment at the time;
   g. retrieving from storage the values of said coefficients which correspond to the simulator computed values of said address designators;
   h. using said retrieved values of said coefficients in said simulator computer to compute by said first set of expressions values of said independent variables; and
   i. generating from said computed values of said independent variables signals which cause said simulator to simulate the operation of said machine under the same machine and environmental conditions and create new values for said address designators.

3. The method of simulating the operation of a machine having complex operating characteristics, said method comprising the steps of:

a. creating mathematical expressions which represent the operation of said machine as functions of primary variables, said mathematical expressions including primary variables as function of coefficients and secondary variables, the values of which primary variables change with changes in the control and ambient conditions of said machine throughout its ranges of operation, the values of which secondary variables change with changes in the values of said primary variables;

b. storing in a simulator computer the various values of said coefficients over the operating ranges of said machine at addresses which are the corresponding values of said secondary variables;

c. generating in said simulator values of said secondary variables from control and ambient conditions of said simulator;

d. using said generated values of said secondary variables to retrieve from storage the corresponding values of said coefficients;

e. generating values of simulated primary variables from the retrieved values of said coefficients; and f. using said computed values of said primary variables to produce control and indication signals for said simulator and for computing new values for said secondary variables.

4. The method defined in claim 3 further including the step of reducing said mathematical expressions to expressions which are functions of a small number of secondary variables to reduce the number of addresses required to retrieve said coefficients from storage.

5. The method defined in claim 3 further including the step of computing external to said simulator computer the values of said coefficients and said secondary variables which correspond to selected values of said primary variables throughout the ranges of operation of said machine.

6. The method defined in claim 5 further including the step of comparing said computed values of said coefficients with corresponding values of said coefficients obtained under the same selected operating conditions of the actual machine being simulated, and modifying when necessary said expressions to achieve close correspondence between said two sets of coefficients.

7. The method of simulating a machine having complex operating characteristics, said method comprising the steps of:

a. creating mathematical expressions which represent the operation of said machine as functions of primary independent variables, the values of which primary independent variables change with changes in the control and ambient conditions of said machine throughout its ranges of operation, said mathematical expressions including secondary independent variables and dependent coefficients;

b. reducing at least some of said mathematical expressions to expressions in which said primary variables are functions of a small number of secondary independent variables;

c. selecting values of said dependent coefficients and computing values of said secondary independent variables from those values of said primary independent variables which correspond to the conditions represented by the selected values of said coefficients;

d. comparing said selected values of said dependent coefficients with corresponding values of said dependent coefficients obtained under the same selected operating conditions of the actual machine being simulated, and modifying when necessary said expressions to achieve close correspondence between two said two sets of dependent coefficients;

e. storing in a simulator the various values of said coefficients over the operating ranges of said machine at addresses represented by corresponding values of said secondary independent variables;

f. generating in said simulator values of said secondary independent variables from control and ambient conditions of said simulator;

g. using said generated values of said secondary independent variables to withdraw from storage the corresponding values of said dependent coefficients;

h. using said withdrawn values of said coefficients in further computations to generate values of simulated primary independent variables; and i. using said computed values of said primary independent variables to produce control and indication signals for said simulator and for computing new values for said secondary independent variables.

* * * * *